United States Patent
Giordano et al.

(10) Patent No.: US 9,677,451 B2
(45) Date of Patent: Jun. 13, 2017

(54) ELECTRONIC CONTROL MODULE FOR AN INTERNAL COMBUSTION ENGINE

(71) Applicant: GM GLOBAL TECHNOLOGY OPERATIONS LLC, Detroit, MI (US)

(72) Inventors: Alberto Giordano, Robilante (IT); Roberto Argolini, Milan (IT); Cristian Taibi, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/792,035

(22) Filed: Jul. 6, 2015

(65) Prior Publication Data
US 2016/0003123 A1    Jan. 7, 2016

(30) Foreign Application Priority Data
Jul. 5, 2014  (DE) .................... 20 2014 005 514 U

(51) Int. Cl.
*F01N 3/00* (2006.01)
*F01N 3/10* (2006.01)
(Continued)

(52) U.S. Cl.
CPC .......... *F01N 11/007* (2013.01); *F01N 3/0814* (2013.01); *F01N 3/0842* (2013.01); *F01N 9/002* (2013.01); *F01N 11/00* (2013.01); *F01N 2550/02* (2013.01); *F01N 2550/03* (2013.01); *F01N 2560/025* (2013.01); *F01N 2900/0418* (2013.01); *F01N 2900/1402* (2013.01);
(Continued)

(58) Field of Classification Search
CPC .... F01N 11/00; F01N 11/007; F01N 2550/02; F01N 2550/03; F01N 2560/025; F01N 2900/0418; F01N 2900/1402; F01N 2900/1614; F01N 2900/1621; F01N 3/0814; F01N 3/0842
USPC .................................. 60/277, 285, 297, 301
See application file for complete search history.

(56) References Cited

U.S. PATENT DOCUMENTS 5,426,934 A * 6/1995 Hunt .................. B01D 53/9495
                                              123/688

FOREIGN PATENT DOCUMENTS

DE    102012218728       *  7/2013
DE    102012218728 A1    7/2013
(Continued)

OTHER PUBLICATIONS

German Patent Office, German Search Report for German Application No. 202014005514.9, dated Feb. 5, 2015.

*Primary Examiner* — Thai Ba Trieu
*Assistant Examiner* — Diem Tran
(74) *Attorney, Agent, or Firm* — Lorenz & Kopf LLP

(57) ABSTRACT

An electronic control module for operating an internal combustion engine is disclosed. The electronic control module is configured to monitor a first air-fuel equivalence ratio of engine exhaust gases upstream of a NOx trap, and to activate a diagnostic routine for the NOx trap when the first air-fuel equivalence ratio is smaller than one. The diagnostic routine enables the electronic control module to monitor a second air-fuel equivalence ratio of engine exhaust gases downstream of the NOx trap, to use the first and second air-fuel equivalence ratios to calculate an index that is representative of the conversion efficiency of the NOx trap, and to identify a failure of the NOx trap when the efficiency index is lower than a predetermined threshold value.

17 Claims, 5 Drawing Sheets

(51) Int. Cl.
*F01N 11/00* (2006.01)
*F01N 3/08* (2006.01)
*F01N 9/00* (2006.01)

(52) U.S. Cl.
CPC ............... *F01N 2900/1614* (2013.01); *F01N 2900/1621* (2013.01); *Y02T 10/24* (2013.01); *Y02T 10/47* (2013.01)

(56) References Cited

FOREIGN PATENT DOCUMENTS

| | | |
|---|---|---|
| KR | 1020110063140 A | 6/2011 |
| WO | 2008142342 A2 | 11/2008 |
| WO | 2014090485 A1 | 6/2014 |

* cited by examiner

ELECTRONIC CONTROL MODULE FOR AN INTERNAL COMBUSTION ENGINE

CROSS-REFERENCE TO RELATED APPLICATION

This application claims priority to German Patent Application No. 202014005514.9, filed Jul. 5, 2014, which is incorporated herein by reference in its entirety.

TECHNICAL FIELD

The present disclosure pertains to an electronic control module (ECM) for operating an internal combustion engine, for example a diesel engine, and more particularly to a strategy that enables the electronic control module to diagnose the complete failure of an $NO_x$ trap (lean $NO_x$ trap, LNT), which constitutes part of the post-processing system of the internal combustion engine.

BACKGROUND

An internal combustion engine conventionally includes an engine block with at least one cylinder. Each cylinder accommodates a piston, which is connected to a crankshaft via a connecting rod and, in conjunction with a cylinder head, defines a combustion chamber. A mixture of air and fuel is introduced into the combustion chamber and ignited in cyclical manner, thereby producing rapidly expanding gases that drive linear movements of the piston, which in turn are converted into rotation of the crankshaft by the connecting rod.

The waste gases produced by the combustion of the fuel are emitted into the atmosphere via an exhaust system, which conventionally includes an exhaust manifold attached to the engine cylinder, an exhaust pipe extending away from the exhaust manifold, and one or more post-processing devices installed in the exhaust pipe in order to collect and/or alter the composition of the pollutants in the waste gases. Regarding these post-processing devices, internal combustion engines, and in particular diesel engines, may include a $NO_x$ trap (LNT).

The LNT is a catalytic device that includes catalytic agents such as rhodium. platinum and palladium as well as adsorbents, for example barium-based compounds, which have active positions configured to bind and trap the nitrogen oxides ($NO_x$) contained in the exhaust gas.

When the quantity of $NO_x$ collected in the LNT exceeds a predetermined threshold value, the LNT undergoes a regeneration process or cycle, also referred to as $DeNO_x$ regeneration, the effect of which is to release and reduce the nitrogen oxides ($NO_x$) that have accumulated in the LNT.

$DeNO_x$ regeneration is conventionally carried out by operating the internal combustion engine in a rich combustion mode. Rich combustion mode conditions are obtain when the air-fuel mixtures that are in the combustion chambers and have been ignited are in an air-fuel ratio that is lower than the stoichiometric value thereof (i.e. air-fuel equivalence ratio λ<1). During $DeNO_x$, regeneration, these rich air-fuel mixtures are usually achieved by injecting one or more additional quantities of fuel into the combustion chamber after the main injection operation. These subsequent injections include small quantities of fuel that are injected into the combustion chamber after the piston in question has passed top dead center (TDC). In this way, the post-injection fuel is combusted in the combustion chamber without significantly increasing the torque applied to the crankshaft, but still raising the temperature and content of hydrocarbons (HC) and carbon monoxide (CO) in the exhaust gases. As they pass through the LNT, these exhaust gases deliver the energy needed to break the chemical bond at the barium position, so that the trapped $NO_x$ (particularly NO and $NO_2$) are released. At the same time, the exhaust gases create an environment that is rich in HC/CO, so that the released $NO_x$ gases can be converted into molecular nitrogen ($N_2$), carbon dioxide ($CO_2$) and water ($H_2O$) according to the following reactions:

(1)

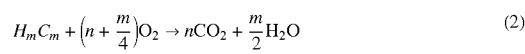

(2)

In this context, some of the strictest environmental protection regulations demand that the performance capability of the LNT with regard to $NO_x$ conversion be tested with the engine running for diagnosing a possible malfunction and implementing counter-measures to prevent excessive $NO_x$ emissions. If the $NO_x$ emissions from the internal combustion engines are consistently below a predetermined threshold value, according to these regulations the performance capability of the LNT can be tested simply by determining the point in time when it completely loses the ability to convert even the smallest quantity of $NO_x$ (i.e. the LNT has failed completely).

One solution for determining the complete failure of the LNT includes using two $NO_x$ sensors, one upstream and one downstream of the LNT, to calculate the difference between the quantity of $NO_x$ the enters the LNT and the quantity that leaves the LNT. With this solution, it is possible not only to detect complete failure of the LNT, it also allows a reliable assessment to be made regarding its effectiveness at any point in its service life. However, the NOx sensors are relatively expensive, and they can consequently raise the overall costs of the exhaust gas system to unacceptable levels, particularly if the corresponding internal combustion engine is intended for small motor vehicles, city cars or other inexpensive vehicles.

In addition, other objects, desirable features and characteristics will become apparent from the subsequent summary and detailed description, and the appended claims, taken in conjunction with the accompanying drawings and this background.

SUMMARY

In view of the preceding comments, the present disclosure provides a solution for reliable detection of total failure of the LNT without using NOx sensors. This solution has does not increase, or at the worst only increases the manufacturing costs of conventional exhaust gas systems by a minimal amount.

The embodiments of the present disclosure are based generally on the observation that the chemical reactions (1) and (2) that take place in the LNT during a rich combustion mode alter the oxygen content of the exhaust gases that are passing through it. Since the concentration of oxygen in the exhaust gases is known both upstream and downstream of the LNT, it is possible to determine whether conversion reactions (1) and (2) are occurring such that the LNT is functioning or are not occurring such that total failure of the LNT is indicated.

Accordingly, one embodiment of the present disclosure provides an electronic control module for operating an internal combustion engine. The electronic control module monitors a first air-fuel equivalence ratio in engine exhaust gases upstream of a $NO_x$ trap, and activates a diagnostic routine for the NOx trap when the first air-fuel equivalence ratio is less than 1. The diagnostic routine enables the electronic control module to monitor a second air-fuel ratio in the engine exhaust gases downstream of the NOx trap; to use the first and second air-fuel equivalence ratios to calculate an index that is representative of the conversion efficiency of the NOx trap; and to identify the failure of the NOx trap when the efficiency index is below a predetermined threshold value.

This solution provides a reliable strategy for detecting the total failure of the LNT. The air-fuel equivalence ratios can be monitored, for example by measuring with the aid of two lambda probes, which are arranged upstream and downstream respectively of the LNT in the exhaust pipe. These two lambda probes are significantly less expensive than NOx sensors, and are usually already installed in the exhaust pipe to carry out other control tasks, so the post-processing system requires fewer sensors. The suggested solution thus has no discernible effect on the costs of manufacturing the exhaust gas system. However, the same diagnostic strategy may also be applied using NOx sensors, which may be used instead of the aforementioned lambda probes to measure the air-fuel equivalence ratios.

According to one aspect of the present disclosure, the electronic control module may particularly be configured to use the first air-fuel equivalence ratio to calculate a total quantity of hydrocarbons and carbon monoxide that enters the NOx trap in a given time period; to use the first and second air-fuel ratios to calculate a total quantity of hydrocarbons and carbon monoxide that is converted in the NOx trap in the same time period; and to calculate the efficiency index as a ratio of the total quantity of hydrocarbons and carbon monoxide converted in the NOx trap to the total quantity of hydrocarbons and carbon monoxide entering the NOx trap.

With this aspect of the present disclosure, a reliable index of the degree of conversion efficiency of the LNT is obtained. In fact, the air-fuel equivalence ratio is correlated to the CO and HC content of the exhaust gases. Since the air-fuel ratio of the gases upstream and downstream of the LNT is known, it is therefore possible to calculate an indirect measurement value for the total quantity of HCs and CO that enters the LNT and a measurement value for the total quantity of HCs and CO that is consumed (i.e., catalytically converted) in the LNT. Additionally, according to the aforementioned reactions (1) and (2), the total quantity of HCs and CO consumed in the LNT is proportional to the quantity of $NO_x$ and $O_2$ that is converted into $N_2$ and $CO_2$. It follows that the ratio between the total quantity of HCs and CO consumed in the LNT and the total quantity of HCs and CO that enters the LNT represents a reliable index of the efficiency of $NO_x$ and $O_2$ conversion in the LNT.

According to another aspect of the present disclosure, the electronic control module may be configured to calculate the total quantity of hydrocarbons and carbon monoxide entering the NOx trap by integrating the following function over the time period:

$$f1 = \dot{m}_b \cdot (1 - AFR_{up})$$

wherein:
$\dot{m}_b$ is a total mass flow rate of the fuel injected into the engine; and $AFR_{up}$ is the first air-fuel equivalence ratio.
This provides a simple way to calculate the total quantity of hydrocarbons and carbon monoxide entering the LNT.

According to another aspect of the present disclosure, the electronic control module may be configured to calculate the total quantity of hydrocarbons and carbon monoxide converted in the NOx trap by integrating the following function over the time period:

$$f2 = \dot{m}_b \cdot \left( \frac{AFR_{dwn} - AFR_{up}}{AFR_{dwn}} \right)$$

wherein:
$\dot{m}_b$ is the total mass flow rate of the injected fuel;
$AFR_{up}$ is the first air-fuel equivalence ratio; and
$AFR_{dwn}$ is the second air-fuel equivalence ratio.
This provides a simple way to calculate the total quantity of hydrocarbons and carbon monoxide converted in the LNT.

According to another aspect of the present disclosure, the electronic control module may be configured to delay calculation of the total quantities of hydrocarbons and carbon monoxide until the second air-fuel equivalence ratio is lower than a predetermined threshold value. This solution makes it possible not to start the integrations until the LNT system has reached (or almost reached) a stable state, thus rendering the HC/CO quantities more reliable.

According to another aspect of the present disclosure, the electronic control module may be configured to stop calculating the total quantities of hydrocarbons and carbon monoxide when a breakthrough event occurs. A breakthrough event may occurs when the following conditions are met temporarily: the value of the first air-fuel equivalence ratio is within a predetermined value range; and the second air-fuel equivalence ratio falls below a second threshold value. This solution makes it possible to stop the integrations while the LNT system is still in a stable (or nearly stable) state, thus making the calculation of the HC/CO quantities more reliable.

According to another embodiment of the present disclosure, the electronic control module may be configured to cancel the diagnostic routine after the calculations of the total quantities of hydrocarbons and carbon monoxide have been completed (that is to say, to stop the routine and/or disregard the results thereof) when the total quantity of hydrocarbons and carbon monoxide calculated to be entering the NOx trap is below a predetermined threshold value. This aspect has the effect of improving the reliability of the diagnostic routine, because the results therefrom are only taken into account if the LNT has in fact received a quantity of HCs and CO that is sufficient to initiate reactions (1) and (2).

According to another aspect of the present disclosure, the electronic control module may be configured to prevent the start of calculations of the total quantities of hydrocarbons and carbon monoxide and cancel the diagnostic routine when at least one of the following inhibiting conditions occurs: the first air-fuel equivalence ratio becomes greater than one; or the first air-fuel equivalence ratio becomes less than a predetermined threshold value. The effect of this solution is that the diagnostic routine is cancelled if the engine operation tends toward a lean combustion mode or combustion modes that are so rich that they represent unreliable or critical conditions before the calculation of HC and CO quantities begins.

According to another aspect of the present disclosure, the electronic control module may be configured to cancel the calculations of the total quantities of hydrocarbons and carbon monoxide before they are completed and to cancel the diagnostic routine when at least one of the following cancellation conditions occurs: the first air-fuel equivalence ratio becomes greater than 1; the first air-fuel equivalence ratio becomes less than a predetermined threshold value; and the second air-fuel equivalence ratio becomes less than the first air-fuel equivalence ratio (without ever exceeding the breakthrough condition stated above). The effect of this solution is that the diagnostic routine is cancelled when the LNT system is working under conditions that do not guarantee reliable results while the HC and CO quantities are being calculated.

According to another aspect of the present disclosure, the electronic control module may be configured to prevent the diagnostic routine from being activated if a requirement for a DeNOx regeneration operation has not been activated. This solution ensures that the diagnostic routine is run in such manner that it coincides with a DeNO$_x$ regeneration operation, so that the rich combustion modes intended for this special operation are used. Of course, other conditions that prevent the activation of the diagnostic routine may also be specified.

In addition, a number of general conditions may also be specified that are monitored while the engine is running and may cause the diagnostic strategy not to be started and/or to be cancelled. For example, the electronic control module may be configured to prevent the activation of the diagnostic routine, or to terminate it (if it has already started) when at least one of the following conditions occurs: the operating point of the engine (i.e., engine speed/engine load) is outside a predetermined range; the space velocity of the NOx trap is lower than a predetermined threshold value; and a functional test of one of the sensors associated with the diagnostic routine fails.

Another embodiment of the present disclosure provides a method for operating an internal combustion engine. A first air-fuel equivalence ratio of engine exhaust gases upstream of an NOx trap is monitored. A diagnostic routine for the NOx trap is activated if the first air-fuel equivalence ratio is less than one. The diagnostic routine includes: monitoring a second air-fuel equivalence ratio of the engine exhaust gases downstream of the NOx trap; using the first and second air-fuel equivalence ratios to calculate an index that is representative of the conversion efficiency of the NOx trap; and identifying a failure of the NOx trap when the efficiency index is lower than a predetermined threshold value. This embodiment of the present disclosure generally has the same effects as the electronic control module disclosed in the preceding, wherein it is particularly configured to ensure a reliable method for detecting a total failure of the LNT.

According to one aspect of the present disclosure, the method may further include: using the first air-fuel equivalence ratio to calculate a total quantity of hydrocarbons and carbon monoxide that enters the NOx trap in a given time period; using the first and second air-fuel equivalence ratio to calculate the total quantity of hydrocarbons and carbon monoxide that is converted in the NOx trap in the same time period; calculating the efficiency index as a ratio of the total quantity of hydrocarbons and carbon monoxide converted in the NOx trap to the total quantity of hydrocarbons and carbon monoxide entering the NOx trap. This aspect of the present disclosure yields a particularly reliable index for the conversion efficiency of the LNT.

According to a further aspect of the present disclosure, the following function may be integrated over time during calculation of the total quantity of hydrocarbons and carbon monoxide entering the NOx trap:

$$f1 = \dot{m}_b \cdot (1 - AFR_{up})$$

wherein:

$\dot{m}_b$ is a total mass flow rate of the fuel injected into the engine; and $AFR_{up}$ is the first air-fuel equivalence ratio.

Because of this solution, it is easy to calculate the total quantity of hydrocarbons and carbon monoxide entering the LNT.

According to a further aspect of the present disclosure, the following function can be integrated over time during calculation of the total quantity of hydrocarbons and carbon monoxide converted in the NOx trap:

$$f2 = \dot{m}_b \cdot \left( \frac{AFR_{dwn} - AFR_{up}}{AFR_{dwn}} \right)$$

wherein:

$\dot{m}_b$ is the total mass flow rate of the injected fuel;

$AFR_{up}$ is the first air-fuel equivalence ratio; and $AFR_{dwn}$ is the second air-fuel equivalence ratio.

Because of this solution, it is easy to calculate the total quantity of hydrocarbons and carbon monoxide entering the LNT.

According to another aspect of the present disclosure, the calculations of the total quantities of hydrocarbons and carbon monoxide may be started when the second air-fuel equivalence ratio is smaller than a predetermined threshold value. This solution makes it possible to start the integrations as soon as the LNT system has reached (or nearly reached) a stable state, making calculation of the HC/CO quantities more reliable.

According to a further aspect of the present disclosure, the calculations of the total quantities of hydrocarbons and carbon monoxide may be ended when a breakthrough event occurs. The breakthrough event occurs when the following conditions are met temporarily: the first air-fuel equivalence ratio is within a prescribed value range; and the second air-fuel equivalence ratio falls below a second threshold value. The effect of this solution is that the integrations can be stopped while the LNT system is still in a stable (or nearly stable) state, thus making the calculation of the HC/CO quantities more reliable.

According to another embodiment of the present disclosure, the method may include the step of cancelling the diagnostic routine after the calculations of the total quantities of hydrocarbons and carbon monoxide have been completed (i.e., cancelling the routine and/or disregarding the results thereof) when the total quantity of hydrocarbons and carbon monoxide calculated to be entering the NOx trap is below a predetermined threshold value. This aspect improves the reliability of the diagnostic routine, because the results therefrom are only taken into account if the LNT has in fact received a quantity of HCs and CO that is sufficient to initiate reactions (1) and (2).

According to another aspect of the present disclosure, the method may include the step of preventing the start of calculations of the total quantities of hydrocarbons and carbon monoxide and cancelling the diagnostic routine when at least one of the following inhibiting conditions occurs: the first air-fuel equivalence ratio becomes greater than one; and the first air-fuel equivalence ratio becomes less than a predetermined threshold value. The effect of this solution is that the diagnostic routine is cancelled if the engine operation tends toward a lean combustion mode or combustion modes that are so rich that they represent unreliable or critical conditions before the calculation of HC and CO quantities begins.

According to another aspect of the present disclosure, the method may include the step of cancelling the calculations of the total quantities of hydrocarbons and carbon monoxide before they are completed and cancelling the diagnostic routine when at least one of the following cancellation conditions occurs: the first air-fuel equivalence ratio becomes greater than 1; the first air-fuel equivalence ratio becomes less than a predetermined threshold value; and the second air-fuel equivalence ratio becomes less than the first air-fuel equivalence ratio (without ever exceeding the breakthrough condition stated above). The effect of this solution is that the diagnostic routine is cancelled when the LNT system is working under conditions that do not guarantee reliable results while the HC and CO quantities are being calculated.

According to a further aspect of the present disclosure, the method may include the step of preventing the diagnostic routine from being activated if a requirement for a DeNOx regeneration operation has not yet been activated. This solution ensures that the diagnostic routine is run in such manner that it coincides with a DeNO$_x$ regeneration operation, so that the rich combustion modes intended for this special operation are used. Of course, there may also be other conditions that prevent the diagnostic routine from being activated.

In addition, they may also be a number of general conditions that are monitored while the engine is running and prevent the diagnostic strategy from being started and/or cause it to be cancelled. For example, the method may include the step of preventing the activation of the diagnostic routine, or terminating it (if it has already started) when at least one of the following conditions occurs: the operating point of the engine (i.e., engine speed/engine load) is outside a predetermined range; the space velocity of the NOx trap is lower than a predetermined threshold value; and a functional test of one of the sensors associated with the diagnostic routine fails.

The method according to all embodiments of the present disclosure may be carried out with the aid of a computer program including a program code for running all of the steps in the method described in the preceding, and in the form of a computer program product containing the computer program. The method may also have the form of an electromagnetic signal, the signal being modulated in such a way that it carries a sequence of data bits representing a computer program for carrying out all steps of the method.

Another embodiment of the present disclosure provides a device for operating an internal combustion engine which monitors a first air-fuel equivalence ratio of engine exhaust gases upstream of a NOx trap, and activates a diagnostic routine for the NOx trap when the first air-fuel equivalence ratio is less than 1. The diagnostic routine monitors a second air-fuel equivalence ratio of engine exhaust gases downstream of the NOx trap, and uses the first and second air-fuel equivalence ratios to calculate an index that is representative of the conversion efficiency of the NOx trap. A failure of the NOx trap is identified when the efficiency index is lower than a predetermined threshold value. This embodiment of the present disclosure generally has the same effects as the electronic control module disclosed in the preceding, wherein it is particularly configured to ensure a reliable method for detecting a total failure of the LNT.

According to one aspect of the present disclosure, the device may use the first air-fuel equivalence ratio to calculate a total quantity of hydrocarbons and carbon monoxide that enters the NOx trap in a given time period, and use the first and second air-fuel equivalence ratios to calculate the total quantity of hydrocarbons and carbon monoxide that is converted in the NOx trap in the same time period. An efficiency index is calculated as a ratio of the total quantity of hydrocarbons and carbon monoxide converted in the NOx trap to the total quantity of hydrocarbons and carbon monoxide entering the NOx trap. This aspect of the present disclosure yields a particularly reliable index for the conversion efficiency of the LNT.

According to another aspect of the present disclosure, calculation of the total quantity of hydrocarbons and carbon monoxide entering the NOx trap may include integration of the following function over time:

$$f1 = \dot{m}_b \cdot (1 - AFR_{up})$$

wherein:

$\dot{m}_b$ is a total mass flow rate of the fuel injected into the engine; and $AFR_{up}$ is the first air-fuel equivalence ratio.

Because of this solution, it is easy to calculate the total quantity of hydrocarbons and carbon monoxide entering the LNT.

According to a further aspect of the present disclosure, the total quantity of hydrocarbons and carbon monoxide converted in the NOx trap calculated may include integration of the following function over time:

$$f2 = \dot{m}_b \cdot \left( \frac{AFR_{dwn} - AFR_{up}}{AFR_{dwn}} \right)$$

wherein:

$\dot{m}_b$ is the total mass flow rate of the injected fuel;

$AFR_{up}$ is the first air-fuel equivalence ratio; and $AFR_{dwn}$ is the second air-fuel equivalence ratio.

Because of this solution, it is easy to calculate the total quantity of hydrocarbons and carbon monoxide converted in the LNT.

According to another aspect of the present disclosure, the device may start the calculations of the total quantities of hydrocarbons and carbon monoxide when the second air-fuel equivalence ratio is smaller than a predetermined threshold value. This solution makes it possible to start the integrations as soon as the LNT system has reached (or nearly reached) a stable state, making calculation of the HC/CO quantities more reliable.

According to a further aspect of the present disclosure, the device may stop the calculations of the total quantities of hydrocarbons and carbon monoxide when a breakthrough event occurs. The breakthrough event occurs when the following conditions are met temporarily: the first air-fuel equivalence ratio is within a prescribed value range, and the second air-fuel equivalence ratio falls below a second threshold value. This solution makes it possible to stop the integrations while the LNT system is still in a stable (or nearly stable) state, thus making the calculation of the HC/CO quantities more reliable.

According to another embodiment of the present disclosure, the device may cancel the diagnostic routine after the calculations of the total quantities of hydrocarbons and carbon monoxide have been completed (i.e., cancelling the routine and/or disregarding the results thereof) when the total quantity of hydrocarbons and carbon monoxide calculated to be entering the NOx trap is below a predetermined threshold value. This aspect has the effect of improving the reliability of the diagnostic routine, because the results therefrom are only taken into account if the LNT has in fact received a quantity of HCs and CO that is sufficient to initiate reactions (1) and (2).

According to another aspect of the present disclosure, the device may prevent the start of calculations of the total quantities of hydrocarbons and carbon monoxide and cancelling the diagnostic routine when at least one of the following inhibiting conditions occurs: the first air-fuel equivalence ratio becomes greater than one; and the first air-fuel equivalence ratio becomes less than a predetermined threshold value. The effect of this solution is that the diagnostic routine is cancelled if the engine operation tends toward a lean combustion mode or combustion modes that are so rich that they represent unreliable or critical conditions before the calculation of HC and CO quantities begins.

According to another aspect of the present disclosure, the device may cancel the calculations of the total quantities of hydrocarbons and carbon monoxide before they are completed and cancelling the diagnostic routine when at least one of the following cancellation conditions occurs: the first air-fuel equivalence ratio becomes greater than one; the first air-fuel equivalence ratio becomes less than a predetermined threshold value; the second air-fuel equivalence ratio becomes less than the first air-fuel equivalence ratio (without ever exceeding the breakthrough condition stated above). The effect of this solution is that the diagnostic routine is cancelled when the LNT system is working under conditions that do not guarantee reliable results while the HC and CO quantities are being calculated.

According to a further aspect of the present disclosure, the device may prevent the diagnostic routine from being activated if a requirement for a DeNOx regeneration operation has not yet been activated. This solution ensures that the diagnostic routine is run in such manner that it coincides with a DeNO$_x$ regeneration operation, so that the rich combustion modes intended for this special operation are used. Of course, there may also be other conditions that prevent the diagnostic routine from being activated.

In addition, they may also be a number of general conditions that are monitored while the engine is running and have the effect of preventing the diagnostic strategy from being started and/or causing it to be cancelled. For example, the device may prevent the activation of the diagnostic routine, or terminating it (if it has already started) when at least one of the following general conditions occurs: the operating point of the engine (i.e., engine speed/engine load) is outside a predetermined range; the space velocity of the NOx trap is lower than a predetermined threshold value; and a functional test of one of the sensors associated with the diagnostic routine fails.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
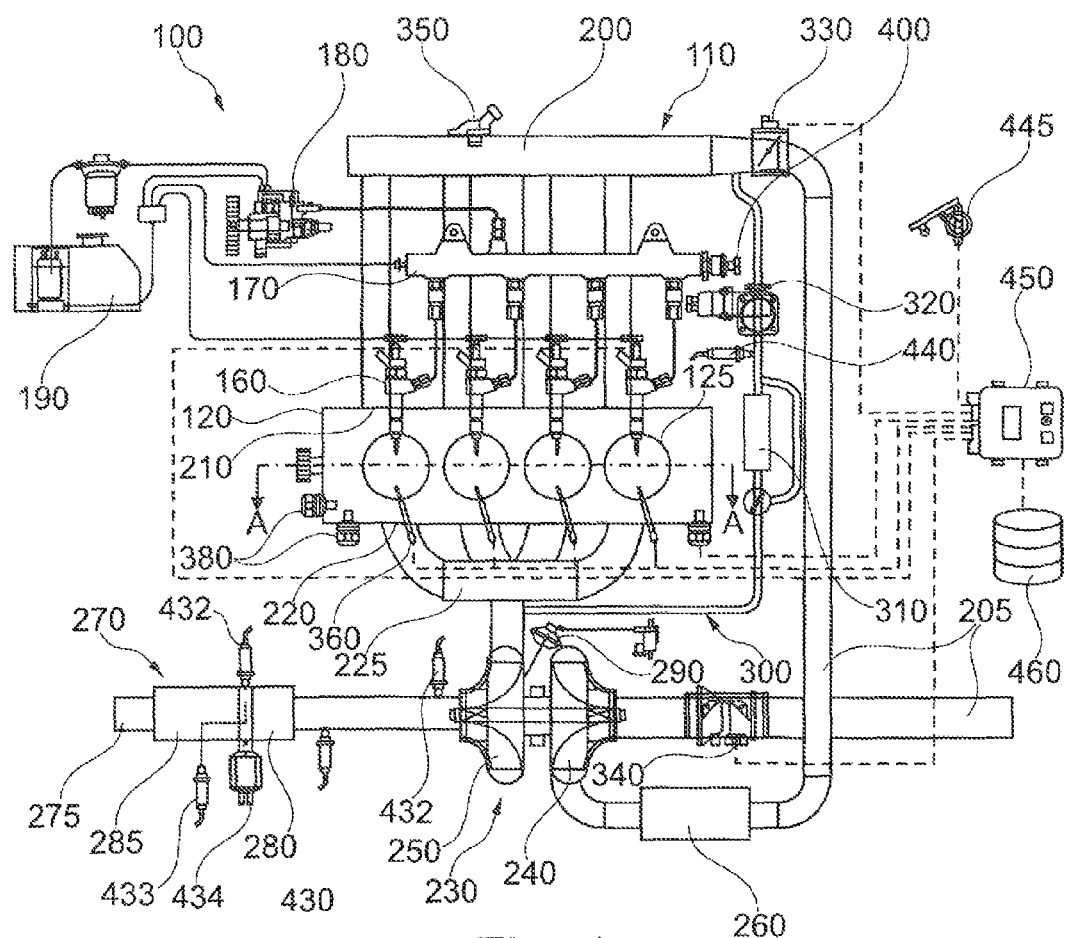
FIG. 1 is a schematic representation of a motor vehicle system according to an embodiment of the present disclosure.
Figure 2:
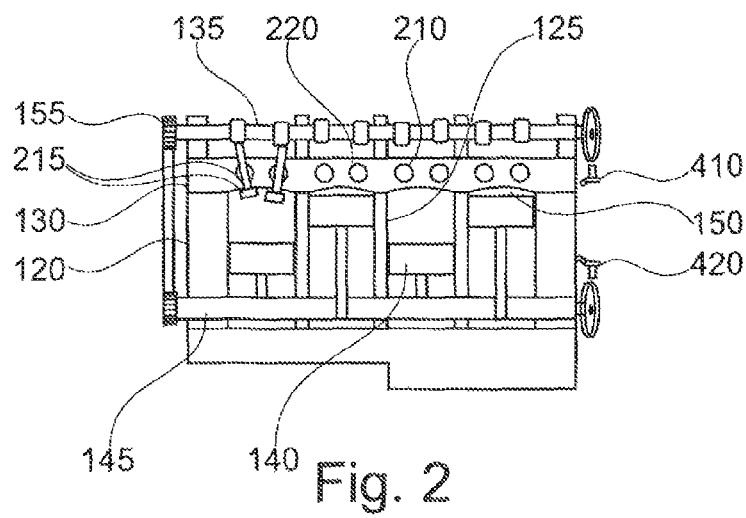
FIG. 2 shows cross section A-A through an internal combustion engine forming part of the motor vehicle system of FIG. 1.

Some embodiments may include a motor vehicle system 100 as shown in FIGS. 1 and 2, having an internal combustion engine (ICE) 110 with an engine block 120 that defines at least one cylinder 125 with a piston 140. The piston 140 has a linkage with which crankshaft 145 is turned. A cylinder head 130 cooperates with piston 140 to define a combustion chamber 150. An air-fuel mixture (not shown) is introduced into combustion chamber 150 and ignited, resulting in hot, expanding combustion gases, which cause piston 140 to move back and forth. The fuel is supplied by at least one fuel injector 160, and the air via at least one inlet 210. The fuel is forwarded to fuel injector 160 under high pressure from a fuel pipe 170, which is connected in fluid conducting manner to a high pressure pump 180, which increases the pressure of a fuel coming from a fuel source 190. Each of the cylinders 125 has at least two valves 215, which are operated by a camshaft 135 that rotates synchronously with crankshaft 145. Valves 215 selectively allow air from inlet 210 to pass into combustion chamber 150 and in alternation therewith permit the exhaust gases to escape via outlet 220. In some embodiments, a camshaft phasing system 155 is used to selectively alter the timing sequence between camshaft 135 and crankshaft 145.

The air may be fed to air inlets 210 via an intake manifold 200. A line 205 supplies intake manifold 200 with ambient air. In other embodiments, a throttle valve 330 may be selected for regulating the flow of air to intake manifold 200. In further embodiments, a system for compressed air is used, such as a turbocharger 230 with a compressor 240 that rotates together with a turbine. The rotation of compressor 240 increases the pressure and temperature of the air in line 205 and in intake manifold 200. An intercooler 260 contained in line 205 may lower the temperature of the air. Turbine 250 is rotated by the inflow of the exhaust gases coming from an exhaust manifold 225, which forwards exhaust gas from outlet 220 through a series of guide vanes before it is expanded by turbine 250. The exhaust gases exit turbine 250 and are led to an exhaust gas system 270. This example shows a variable geometry turbine (VGT) with a VGT actuator 290 that is configured to move the guide vanes or blades so that the blades modify the flow of the exhaust gas through turbine 250. In other embodiments, turbocharger 230 may have a fixed geometry and/or a wastegate.

Exhaust gas system 270 may have an exhaust pipe 275 with one or more exhaust gas post-processing devices. Exhaust gas post-processing systems may be devices of any kind with which the composition of the exhaust gases can be changed. In this example, the post-processing devices include a NOx trap (LNT) 280 and a diesel particle filter (DPF) 285 located close to the engine. Other embodiments include an exhaust gas recirculation system (EGR) 300 connected to exhaust manifold 225 and intake manifold 200. EGR 300 may include an EGR cooler 310 for lowering the temperature of the exhaust gases in EGR 300. An EGR valve 320 controls the flow of exhaust gases in EGR system 300.

Motor vehicle system 100 may further have an electronic control module (ECM) 450 that is configured to transmit and receive signals to or from various devices connected to ICE 100. ECM 450 may receive input signals from various sensors coupled to the ICE 110. For example, the sensors may include one or more of the following: a mass flow and temperature sensor 340, a pressure and temperature sensor 350 for the manifold, a sensor 360 for the pressure in the combustion chamber, sensors 380 for the coolant and oil temperature and/or the associated fill level, a pressure sensor 400 for the fuel, a camshaft position sensor 410, a crankshaft position sensor 420, a first lambda probe 430, arranged inside exhaust pipe 275 upstream of LNT 280 (that is to say between the LNT and turbocharger 230), a second lambda probe 431 arranged inside exhaust pipe 275 downstream of LNT 280 (that is to say between the LNT and DPF 285, for example in the shroud that encloses them both), a first temperature sensor 432 inside exhaust pipe 275 upstream of LNT 280, a second temperature sensor 433 inside exhaust pipe 275 downstream of LNT 280, exhaust gas pressure loss sensor 434 at the outlet from LNT 280, an EGR temperature sensor 440, and a position sensor 445 for the accelerator pedal. ECU 450 is also able to transmit output signals to various control units in order to control the operation of ICE 110. For example, ECU 450 may transmit control signals to fuel injectors 160. to throttle 330, to EGR valve 320, to VGT actuator 290 and to camshaft phasing system 155. It should be noted that dashed lines are used to indicate different connections between the various sensors, devices and the ECM 450, but others have been omitted for the sake or clarity.

Engine control module 450 may include a digital central processing unit (CPU) connected to a storage system and a bus system. The CPU is configured to process commands that have been stored in the form of a program in a storage system 460, to receive input signals from the data bus and send output signals to the data bus. Storage system 460 may include various storage media such as optical, magnetic, solid state and other non-volatile media. The data bus may be configured to transmit analogue and/or digital signals to the various sensors and control devices and receive signals therefrom, and to modulate said signals. The program may be constructed such that it is capable of incorporating and/or executing the processes described here, so that the CPU can execute the steps of said processes and thus control ICE 110.

The program stored in storage medium 460 is sent to the control module from the outside via a wire connection or wirelessly. It is commonly featured outside of motor vehicle system 100 in a computer software product, also referred to as a computer or machine-readable medium, which is understood to be a computer program code on a carrier. In this context, the carrier may be of the volatile or non-volatile kind, meaning that the computer software product may be described as volatile or non-volatile.

One example of a volatile computer software product is a transitory signal, e.g., an electromagnetic signal such as an optical signal, which is a carrier for the computer program code. The capability of carrying the computer program code may be ensured by modulating the signal using a conventional modulation technique such as QPSK for digital data, so that binary data representing the computer program code is superimposed on the volatile electromagnetic signal. Such signals are used for example when a computer program code is transmitted wirelessly to a laptop via a WiFi connection.

In the case of a non-volatile computer software product, a computer program code is incorporated in a non-transitory computer-readable storage medium. The storage medium then becomes the aforementioned non-volatile carrier, with the result that the computer program code is stored permanently or temporarily in or on the storage medium. The storage medium may be of the kind conventionally known in the computer technology field, e.g., a flash memory, an ASIC, a CD or the like.

The motor vehicle system may have a different kind of processor for supplying the electronic logic instead of an engine control module 450, such as an embedded controller, an on-board computer, or any other kind of processor designed for use in a motor vehicle.

While internal combustion engine 110 is operating, ECM 450 may also support a diagnostic system configured to determine the functional state of a multiplicity of engine system components and subsystems. In particular, ECM 450 may be configured to periodically run a diagnostic routine configured to determine whether or not LNT 280 really is capable of converting the accumulated $NO_x$ (i.e., to detect a total failure of the LNT), for example based on a strategy illustrated in the flowchart of FIG. 3.

Figure 4:
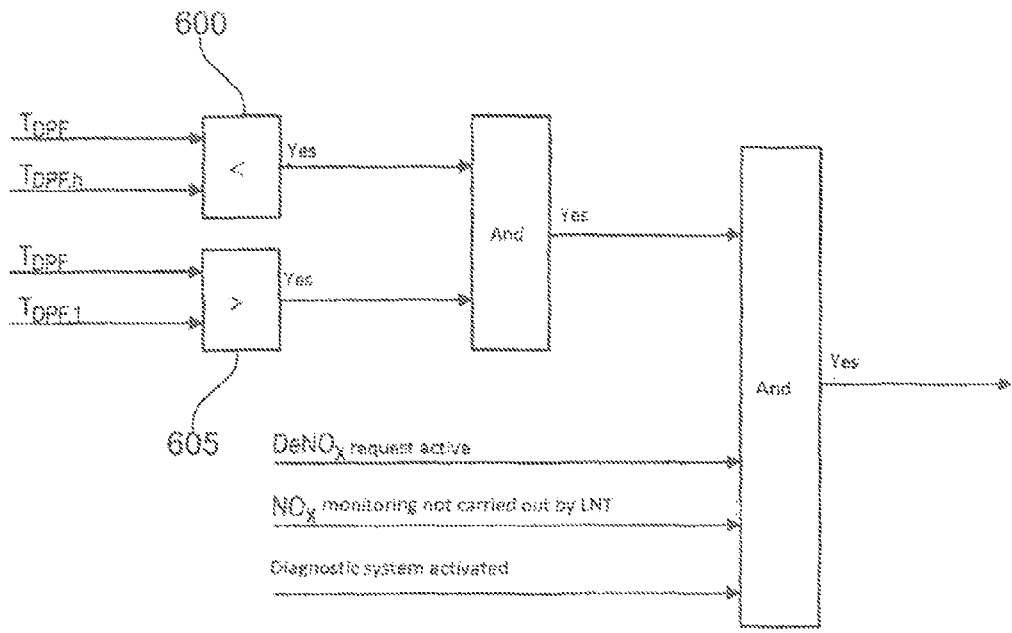
FIGS. 4 to 8 show subroutines that include the operating strategy of FIG. 3.

According to this strategy, ECM 450 may be configured to test various primary activation conditions on a repeating basis during the normal operation of ICE 110 (block 500). As shown in FIG. 4, the primary activation conditions may include the following conditions: a request for a $DeNO_x$ regeneration has been initiated; the exhaust gas temperature $T_{DPF}$ upstream of DPF 285 is within a predetermined acceptable value range, the diagnostic system has been activated; and a process for monitoring $NO_x$ has not yet been performed in the LNT during the current driving cycle.

In detail, temperature $T_{DPF}$ of the exhaust gases upstream of DPF 285 may be monitored by ECM 450 via second temperature sensor 433, which is arranged between LNT 280 and DPF 285. The detected temperature $T_{DPF}$ of the exhaust gases is the compared to an upper threshold value $T_{DPF,h}$ and a lower threshold value $T_{DPF,l}$ by ECM 450. If detected temperature $T_{DPF}$ is lower than upper threshold value $T_{DPF,h}$ (block 600) and higher than lower threshold value $T_{DPF,l}$ (block 605), detected temperature $T_{DPF}$ is acceptable. Upper threshold value $T_{DPF,h}$ and lower threshold value $T_{DPF,l}$ for the exhaust gas temperature upstream of DPF 285 may calibration values that are determined in the course of a test bench trial and then stored in storage system 460.

The request for $DeNO_x$ regeneration is generally initiated by ECM 450 using other strategies that are specifically configured to periodically remove the accumulated NOx from LNT 280. Following the initiation of a request for $DeNO_x$ regeneration, ECM 450 receives the command to operate engine 110 in a rich combustion mode to boost the release and conversion of the accumulated $NO_x$, as explained in the introduction to the present disclosure. ECM 450 receives information via corresponding control strategies as to whether the diagnostic system is activated or deactivated, and whether or not a $NO_x$ monitoring process has been performed in the LNT.

Figure 5:
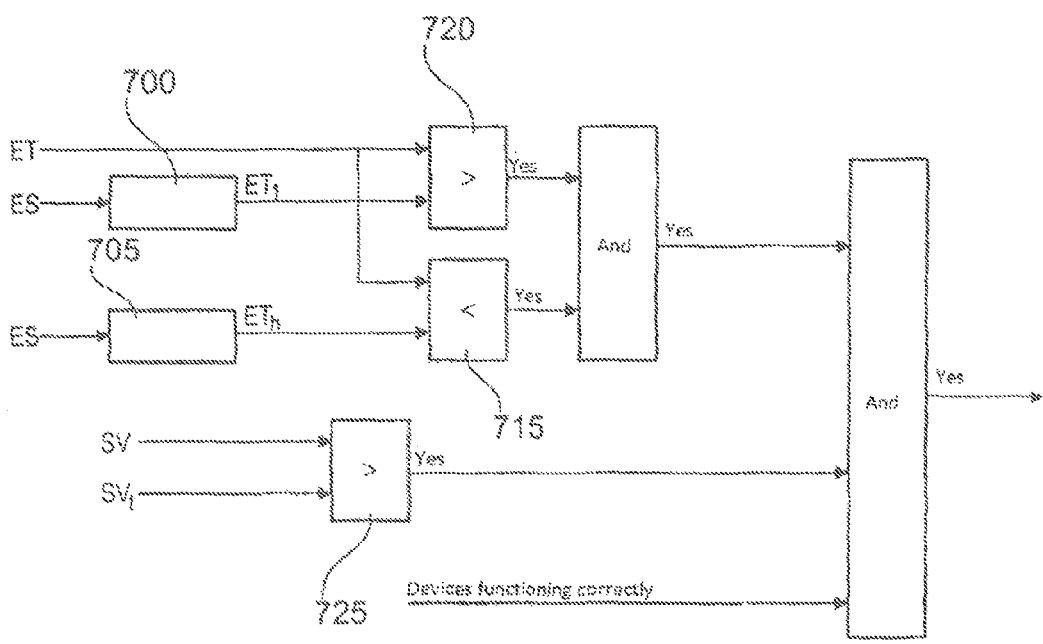

ECM 450 may also carry out repeated checks of a range of secondary activation conditions during the check of the primary activation conditions (block 505). As shown in FIG. 5, the secondary activation conditions may include the following conditions: the operating point of the engine is within a predetermined acceptable range; the space velocity SV of the NOx trap is higher than a predetermined threshold value $SV_t$; all devices involved in the LNT diagnostic process are functioning correctly.

The engine operating point is determined by two parameters, specifically the engine speed ES and the engine torque ET. Engine speed ES may be monitored by ECM 450 with the aid of crankshaft position sensor 420, whereas engine torque ET may be determined on the basis of the signal received from accelerator pedal position sensor 445. In order to determine whether the operating point of the engine is within a predetermined range, ECM 450 may be configured to use the detected engine speed ES as an input in two correlation tables 700 and 705, which output a corresponding lower threshold value $ET_l$ or upper threshold value $ET_h$ respectively for the engine torque. The engine torque ET determined in this way is only acceptable if its value is lower than upper threshold value $ET_h$ (block 715) and higher than lower threshold value $ET_l$ (block 720). The threshold values stored in correlation tables 700 and 705 may be calibration values, which are determined in the course of a test bench trial and then stored in storage system 460.

Regarding the second condition, space velocity SV of LNT 280 may be calculated with the following equation:

$$SV = \frac{\dot{m}_f}{V}$$

wherein:

$\dot{m}_f$ is the mass flow rate of the exhaust gases passing through LNT 280; and V is the volume of the LNT catalyst.

Mass flow rate $\dot{m}_f$ can be determined by ECM 450 on the basis of the airflow in air intake hose 205, which is measured by sensor 340. The calculated space velocity SV is only acceptable if its value is greater than threshold value $SV_t$ (block 725). Threshold value $SV_t$ for the LNT space velocity may also be a calibration value, which is determined in the course of a test bench trial and stored in storage system 460.

Regarding this last condition, the devices involved in the diagnosis of the LNT may include injectors 160, first lambda probe 430, second lambda probe 431, mass flow sensor 340 and second temperature sensor 433. In order to verify that these devices are all functioning correctly, ECM 450 may perform a functional test for each of them. The activation condition is only fulfilled if all of these functional tests confirm that the corresponding component is functioning correctly.

Figure 3:
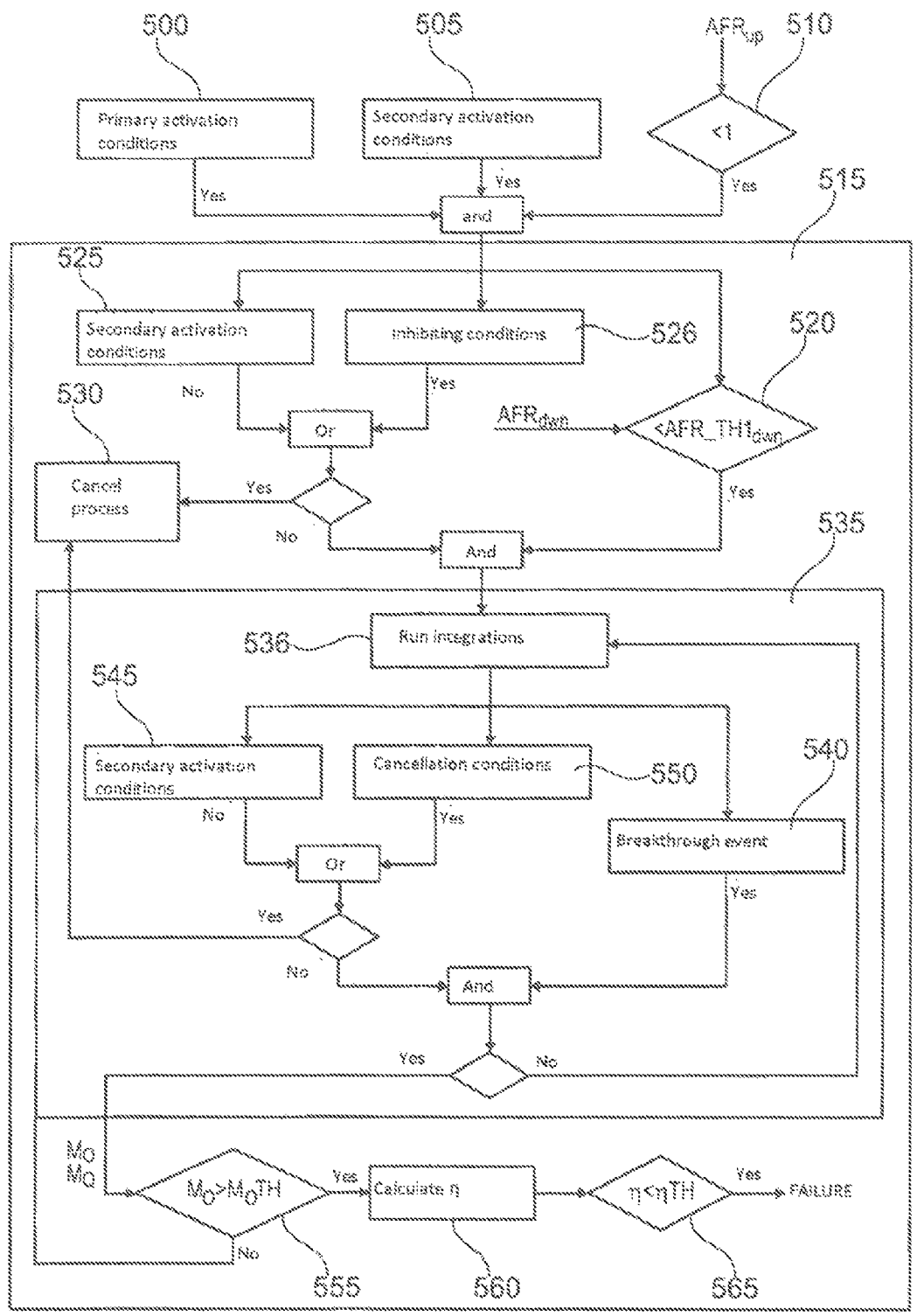
FIG. 3 is a flowchart of a strategy for operating the engine of the motor vehicle system.

As shown in FIG. 3, ECM 450 may be configured to analyze the exhaust gases upstream of LNT 280 on a repeated basis with first lambda probe 430 during the tests for the primary and secondary activation conditions. Based on its mode of operation, first lambda probe 430 thus returns an upstream value $AFR_{up}$ of an air-fuel equivalence ratio ($\lambda$) directly, which is monitored continuously in this way by ECM 450 (block 506).

If all primary and secondary activation conditions have been met, ECM 450 can initiate the process for diagnosing LNT 280 (block 515) when the upstream value $AFR_{up}$ for the air-fuel equivalence ratio falls below 1 (block 510), that is to say when ICE 110 is working in a rich combustion mode. After the initiation, the LNT diagnostic routine may instruct ECM 450 to analyze the exhaust gases downstream of LNT 280 with second lambda probe 431. Based on its mode of operation, second lambda probe 431 returns a downstream value $AFR_{dwn}$ for the air-fuel equivalence ratio ($\lambda$) directly, which is monitored continuously in this way by ECM 450 (block 516). The downstream value $AFR_{dwn}$ of air-fuel equivalence ratio ($\lambda$) is compared with a predetermined first threshold value $AFR\_TH1_{dwn}$ (block 520), which is smaller than the air-fuel equivalence ratio that prevails during the lean combustion modes of internal combustion engine 110. For example, first threshold value $AFR\_TH1_{dwn}$ may be slightly greater than one, or even less than one. At all events, first threshold value $AFR\_TH1_{dwn}$ of the downstream value of air-fuel equivalence ratio ($\lambda$) may be a calibration value that is determined in the course of a test bench trial and then stored in storage system 460.

Figure 6:
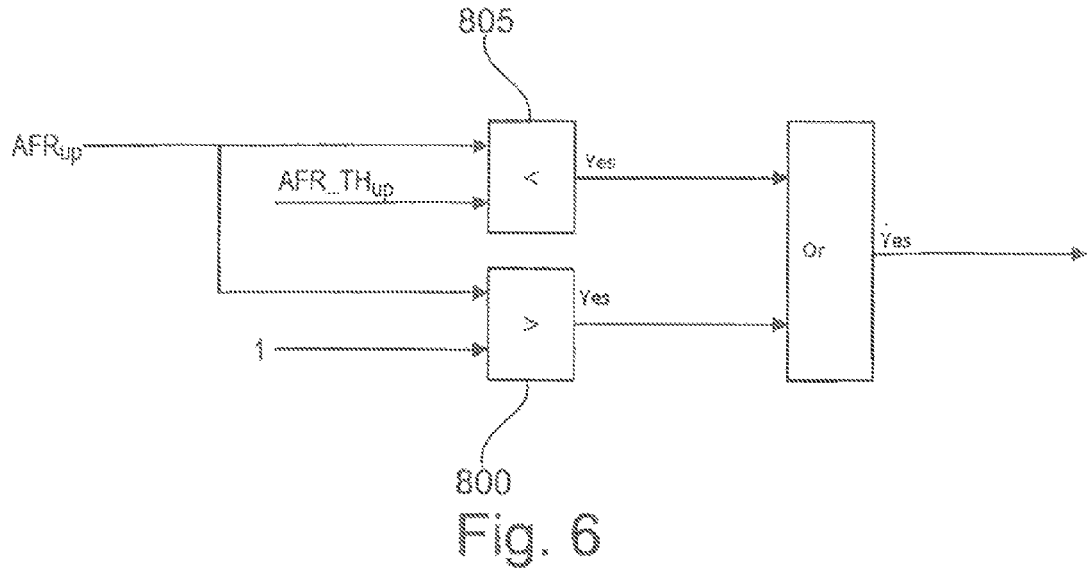

While the downstream value $AFR_{dwn}$ of the air-fuel equivalence ratio ($\lambda$) is being monitored, the LNT diagnostic routine may instruct ECM 450 to continue monitoring the secondary activation conditions (block 525) and the upstream value $AFR_{up}$ of the air-fuel equivalence ratio ($\lambda$). The upstream value $AFR_{up}$ of the air-fuel equivalence ratio ($\lambda$) may be used by ECM 450 to check a number of inhibiting conditions (block 526). As shown in FIG. 6, the inhibiting conditions may be the following: the upstream value $AFR_{up}$ of the air-fuel equivalence ratio becomes greater than one (block 800); and the upstream value $AFR_{up}$ of the air-fuel equivalence ratio falls below a predetermined threshold value $AFR\_TH_{up}$ (block 805).

Figure 9:
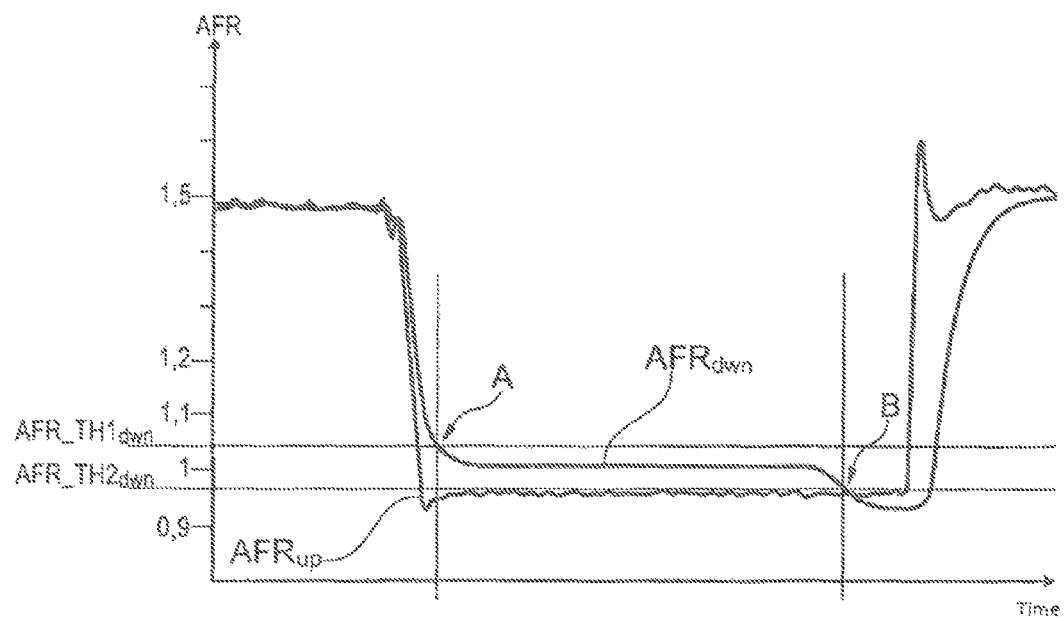
FIG. 9 is a diagram showing the change in the air-fuel ratio over time upstream and downstream of the LNT during a DeNO$_x$ regeneration.

Reference again to FIG. 3, as long as the downstream value $AFR_{dwn}$ of the air-fuel equivalence ratio ($\lambda$) is greater than the threshold value $AFR\_TH1_{dwn}$, ECM 450 can cancel the diagnostic routine (block 530). In other words, the ECM 450 can stop the routine without returning any results if one of said inhibiting conditions is met or if one of the secondary activation conditions is no longer fulfilled. Conversely, if all of the secondary activation conditions are met and no inhibiting condition has occurred, ECM 450 will initiate a calculation phase (block 535), when the downstream value $AFR_{dwn}$ of the air-fuel equivalence ratio falls below the first threshold value $AFR\_TH1_{dwn}$ (as is shown by point A in FIG. 9).

During the calculation phase, ECM 450 generally continues monitoring the upstream value $AFR_{up}$ and the downstream value $AFR_{dwn}$ of the air-fuel equivalence ratio, in which case the upstream value $AFR_{up}$ is used to incrementally calculate a total quantity $M_O$ of HCs and CO that enters LNT 280 over a given time period, and wherein the upstream value $AFR_{up}$ and the downstream value $AFR_{dwn}$ are used to incrementally calculate a total quantity $M_Q$ of HCs and CO that is converted in LNT 280 over the same time period.

In particular, the total quantity $M_O$ of HCs and CO that enters LNT 280 may be calculated incrementally by integrating function f1 over the time using the following equation (block 536):

$$M_O = \int f1 = \int \dot{m}_b \cdot (1 - AFR_{up})$$

At the same time, the total quantity $M_Q$ of HCs and CO that is converted in LNT 280 is also calculated by integrating function f2 over the time using the following equation:

$$M_Q = \int f2 = \int \dot{m}_b \cdot \left( \frac{AFR_{dwn} - AFR_{up}}{AFR_{dwn}} \right)$$

wherein:

$\dot{m}b$ is a total mass flow rate of the fuel injected into engine 110.

The mass flow rate $\dot{m}_b$ of the injected fuel can be calculated by ECM 450 using known strategies on the basis of the injection profile.

Figure 7:
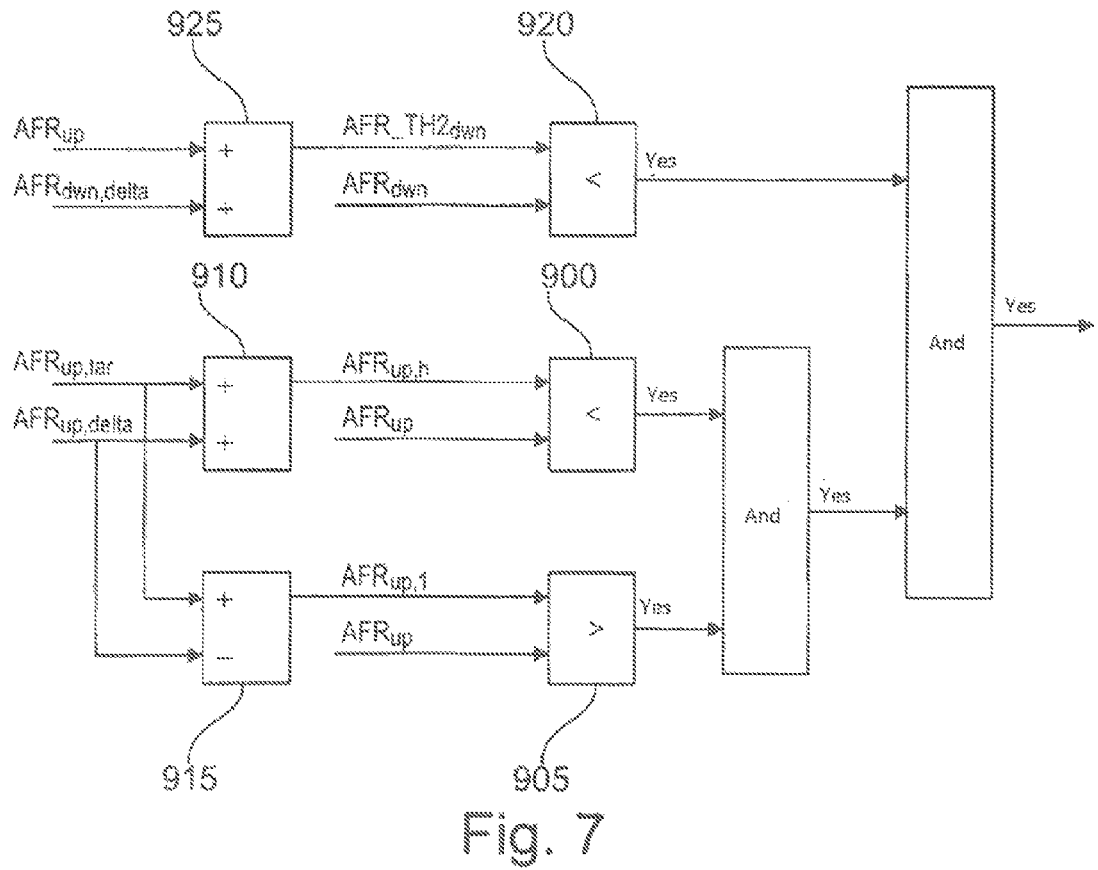

The calculation phase may continue indefinitely and it may be terminated when a breakthrough event occurs (block 540). As represented in FIG. 7, in order to detect a breakthrough event, ECM 450 may be configured to check whether the following conditions are fulfilled on a repeated basis during the calculation phase: the upstream value $AFR_{up}$ of the air-fuel equivalence ratio is within a prescribed value range; and the downstream value $AFR_{dwn}$ of the air-fuel equivalence ratio falls below a second threshold value $AFR\_TH2_{dwn}$ (block 920), which may be smaller than the aforementioned first threshold value $AFR\_TH1_{dwn}$.

In order to test the first condition, the detected upstream value $AFR_{up}$ of the air-fuel equivalence ratio is compared repeatedly with an upper threshold value $AFR_{up,h}$ and a lower threshold value $AFR_{up,l}$ by ECM 450. If the detected upstream value $AFR_{up}$ is below the upper threshold value $AFR_{up,h}$ (block 900) and above the lower threshold value $AFR_{up,l}$ (block 905), the condition is satisfied, otherwise the condition is not satisfied. The upper threshold value $AFR_{up,h}$ and the lower threshold value $AFR_{up,l}$ fro the upstream value of the air-fuel equivalence ratio may be calculated by ECM 450 on the basis of a target value for the upstream value $AFR_{up,tar}$ of the air-fuel equivalence ratio, which is set by the DeNO$_x$ strategy. In particular, the upper threshold value $AFR_{up,h}$ and the lower threshold value $AFR_{up,l}$ can be calculated by adding a predetermined differential value $AFR_{up,delta}$ to the target value $AFR_{up,tar}$ (block 910) or subtracting it therefrom (block 915). Differential value $AFR_{up,delta}$ may be a calibration value, which is determined in the course of a test bench trial and then stored in storage system 460.

Regarding the second conditions, the second threshold value $AFR\_TH2_{dwn}$ may be calculated for the downstream value of the air-fuel equivalence ratio by adding a predetermined positive increment $AFR_{dwn,delta}$ to the upstream value $AFR_{up}$ of the air-fuel equivalence ratio (block 925). This increment $AFR_{dwn,delta}$ may be a calibration value that is determined in a test bench trial and then stored in storage system 460. As mentioned previously, the second condition is only satisfied if the downstream value $AFR_{dwn}$ of the air-fuel equivalence ratio falls below a second threshold value $AFR\_TH2_{dwn}$ (block 925). When both of the conditions described in the preceding are satisfied at the same time, ECM 450 identifies a breakthrough event and ends the calculation phase (as indicated with point B in FIG. 9).

Figure 8:
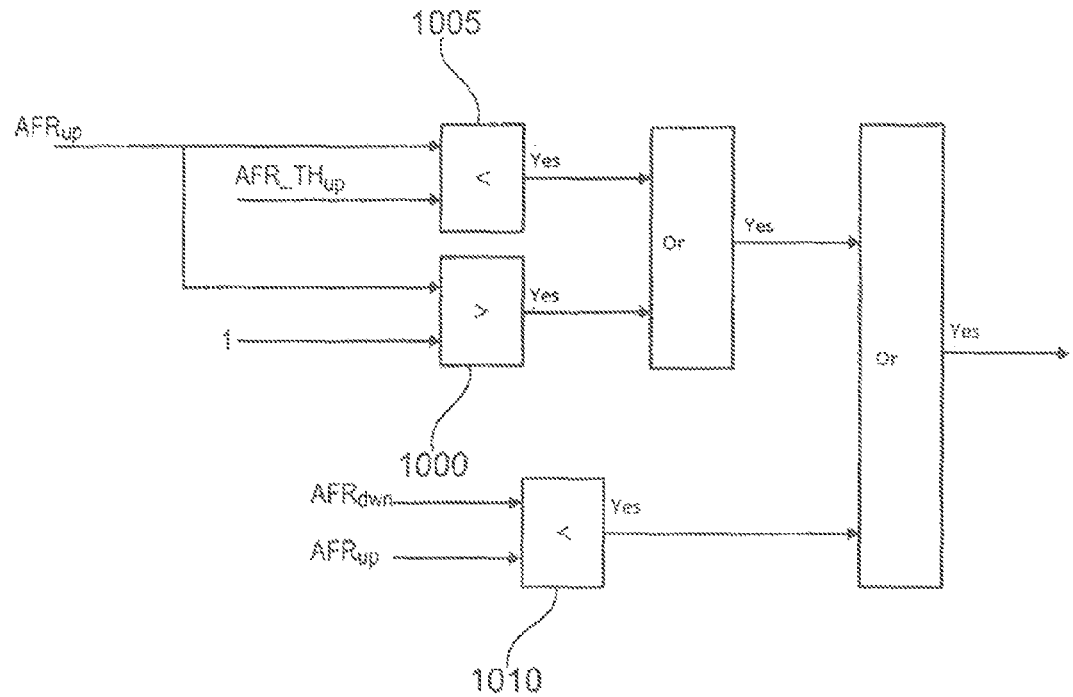

FIG. 3 also shows that ECM 450 continues monitoring the secondary activation conditions (block 545) during the calculation phase, and also checks for the possible occurrence of a number of cancellation conditions (block 550). As is represented in FIG. 8, the cancellation conditions are as follows: the upstream value $AFR_{up}$ of the air-fuel equivalence ratio becomes greater than one (block 1000); the upstream value $AFR_{up}$ of the air-fuel equivalence ratio falls below the predetermined threshold value $AFR\_TH_{up}$ (block 1005); or the downstream value $AFR_{dwn}$ of the air-fuel equivalence ratio falls below the upstream value $AFR_{up}$ of the air-fuel equivalence ratio (without exceeding the breakthrough condition described in the preceding) (block 1010). It should be noted that the first two cancellation conditions are identical with the inhibiting conditions described previously. If one of these cancellation conditions occurs or if one of the secondary activation conditions is no longer satisfied while the calculation phase is running, ECM 450 will cancel the diagnostic routine (block 530), i.e., it will stop the calculation phase without returning any results.

However, if the calculation phase terminates normally as a result of detection of the breakthrough event, ECM 450 compares the resulting total value $M_O$ of HCs and CO with a threshold value $M_O TH$ (block 555). This threshold value $M_O TH$ may be a calibration value, which is determined in the course of a test bench trial and then stored in storage system 460. If the total value for HCs and CO is smaller than the threshold value, ECM 450 will cancel the diagnostic routine (block 530), i.e., it will stop the routine and disregard the results of the calculation phase. Conversely, if a the total value for HCs and CO $M_O$ is greater than the threshold value $M_O TH$, ECM 450 calculates an index $\eta$ that is representative of a level of conversion efficiency of LNT 280 (block 560). This efficiency index $\eta$ can be calculated with the following equation:

$$\eta = \frac{M_Q}{M_O}.$$

Finally, efficiency index $\eta$ is compared with a threshold value $\eta TH$ (block 565). This threshold value $\eta TH$ may be a calibration value, which is determined in the course of a test bench trial and then stored in storage system 460. If efficiency index $\eta$ is greater than the threshold value $\eta TH$, LNT 280 is considered to be in working order, if not, ECM 450 reports a total failure of LNT 280 (block 526).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An electronic control module for operating an internal combustion engine, wherein the electronic control module is configured to:
monitor a first air-fuel equivalence ratio of engine exhaust gases upstream of a NOx trap; and
activate a diagnostic routine for the NOx trap when the first air-fuel equivalence ratio is smaller than 1; wherein the diagnostic routine enables the electronic control module to:
monitor a second air-fuel equivalence ratio of engine exhaust gases downstream of the NOx trap; use the first and second air-fuel equivalence ratios to calculate an index that is representative of a conversion efficiency of the NOx trap; and
identify a failure of the NOx trap when the conversion efficiency index is lower than a predetermined threshold value; wherein the electronic control module is configured to:
use the first air-fuel equivalence ratio to calculate a total quantity of hydrocarbons and carbon monoxide entering the NOx trap in a given time period;

use both the first and second air-fuel equivalence ratios to calculate a total quantity of hydrocarbons and carbon monoxide converted in the NOx trap in the same time periods;

calculate the conversion efficiency index as a ratio between the total quantity of hydrocarbons and carbon monoxide converted in the NOx trap and the total quantity of hydrocarbons and carbon monoxide entering the NOx trap; and wherein the electronic control module is configured to stop calculating total quantities of hydrocarbons and carbon monoxide entering and being converted in the NOx trap when a breakthrough event occurs, wherein the breakthrough event occurs when following conditions are met temporarily: a value of the first air-fuel equivalence ratio is within a prescribed value range; and a value of the second air-fuel equivalence ratio is less than a second threshold value.

2. The electronic control module according to claim 1, wherein the electronic control module is configured to calculate the total quantity of hydrocarbons and carbon monoxide entering the NOx trap by integrating the following function over time:

$$f1 = \dot{m}_b \cdot (1 - \text{AFR}_{up})$$

wherein:
$\dot{m}_b$ is a total mass flow rate of the fuel injected into the engine; and
$\text{AFR}_{up}$ is the first air-fuel equivalence ratio.

3. The electronic control module according to claim 2, wherein the electronic control module is configured to calculate the total quantity of hydrocarbons and carbon monoxide converted in der NOx trap by integrating the following function over time:

$$f2 = \dot{m}_b \cdot \left( \frac{\text{AFR}_{dwn} - \text{AFR}_{up}}{\text{AFR}_{dwn}} \right)$$

wherein:
$\dot{m}_b$ is the total mass flow rate of the injected fuel;
$\text{AFR}_{up}$ is the first air-fuel equivalence ratio; and
$\text{AFR}_{dwn}$ is the second air-fuel equivalence ratio.

4. The electronic control module according to claim 1, wherein the electronic control module is configured to start the calculations of the total quantities of hydrocarbons and carbon monoxide when the second air-fuel equivalence ratio is less than a predetermined threshold value.

5. The electronic control module according to claim 1, wherein the electronic control module is configured to cancel the diagnostic routine after completion of the calculations of the total quantities of hydrocarbons and carbon monoxide when the calculated total quantity of hydrocarbons and carbon monoxide entering the NOx trap is smaller than a predetermined threshold value.

6. The electronic control module according to claim 1, wherein the electronic control module is configured to prevent the start of the calculations of the total quantities of hydrocarbons and carbon monoxide and cancel the diagnostic routine when at least one of the following inhibiting conditions is satisfied: the first air-fuel equivalence ratio becomes greater than one; and the first air-fuel equivalence ratio falls below a predetermined threshold value.

7. The electronic control module according to claim 1, wherein the electronic control module is configured to cancel the calculations of the total quantities of hydrocarbons and carbon monoxide before they are completed and cancel the diagnostic routine when at least one of the following cancellation conditions is met:
the first air-fuel equivalence ratio becomes greater than one;
the first air-fuel equivalence ratio falls below a predetermined threshold value; and
the second air-fuel equivalence ratio becomes smaller than the first air-fuel equivalence ratio.

8. The electronic control module according to claim 1 wherein the electronic control module is configured to prevent the activation of the diagnostic routine if a request for a DeNOx regeneration operation has not yet been initiated.

9. A method of operating an internal combustion engine comprising:
monitoring a first air-fuel equivalence ratio of engine exhaust gases upstream of a NOx trap; and
activating a diagnostic routine for the NOx trap when the first air-fuel equivalence ratio is smaller than 1;
wherein the diagnostic routine includes:
monitoring a second air-fuel equivalence ratio of engine exhaust gases downstream of the NOx trap;
using the first and second air-fuel equivalence ratios to calculate an index that is representative of a conversion efficiency of the NOx trap; and
identifying a failure of the NOx trap when the conversion efficiency index is lower than a predetermined threshold value; and
stopping calculating total quantities of hydrocarbons and carbon monoxide entering and being converted in the NOx trap when a breakthrough event occurs, wherein the breakthrough event occurs when following conditions are met temporarily: a value of the first air-fuel equivalence ratio is within a prescribed value range; and a value of the second air-fuel equivalence ratio is less than a second threshold value.

10. The method according to claim 9 further comprising:
using the first air-fuel equivalence ratio to calculate a total quantity of hydrocarbons and carbon monoxide entering the NOx trap in a given time period;
using both the first and second air-fuel equivalence ratios to calculate a total quantity of hydrocarbons and carbon monoxide converted in the NOx trap in the same time period; and
calculating the efficiency index as a ratio between the total quantity of hydrocarbons and carbon monoxide converted in the NOx trap and the total quantity of hydrocarbons and carbon monoxide entering the NOx.

11. The method according to claim 10 further comprising calculating the total quantity of hydrocarbons and carbon monoxide entering the NOx trap by integrating the following function over time:

$$f1 = \dot{m}_b \cdot (1 - \text{AFR}_{up})$$

wherein:
$\dot{m}_b$ is a total mass flow rate of the fuel injected into the engine; and
$\text{AFR}_{up}$ is the first air-fuel equivalence ratio.

12. The method according to claim 11 further comprising calculating the total quantity of hydrocarbons and carbon monoxide converted in der NOx trap (280) by integrating the following function over time (536):

$$f2 = \dot{m}_b \cdot \left( \frac{\text{AFR}_{dwn} - \text{AFR}_{up}}{\text{AFR}_{dwn}} \right)$$

wherein:
$\dot{m}_b$ is the total mass flow rate of the injected fuel;
$AFR_{up}$ is the first air-fuel equivalence ratio; and
$AFR_{dwn}$ is the second air-fuel equivalence ratio.

13. The method according to claim 9 further comprising starting the calculations of the total quantities of hydrocarbons and carbon monoxide when the second air-fuel equivalence ratio is less than a predetermined threshold value.

14. The method according to claim 9 further comprising cancelling the diagnostic routine after completion of the calculations of the total quantities of hydrocarbons and carbon monoxide when the calculated total quantity of hydrocarbons and carbon monoxide entering the NOx trap is smaller than a predetermined threshold value.

15. The method according to claim 9 further comprising preventing the start of the calculations of the total quantities of hydrocarbons and carbon monoxide and cancel the diagnostic routine when at least one of the following inhibiting conditions is satisfied: the first air-fuel equivalence ratio becomes greater than one; and the first air-fuel equivalence ratio falls below a predetermined threshold value.

16. The method according to claim 9 further comprising cancelling the calculations of the total quantities of hydrocarbons and carbon monoxide before they are completed and cancel the diagnostic routine when at least one of the following cancellation conditions is met:
the first air-fuel equivalence ratio becomes greater than one;
the first air-fuel equivalence ratio falls below a predetermined threshold value; and
the second air-fuel equivalence ratio becomes smaller than the first air-fuel equivalence ratio.

17. The method according to claim 9 further comprising preventing the activation of the diagnostic routine if a request for a DeNOx regeneration operation has not yet been initiated.

\* \* \* \* \*